May 3, 1966 M. J. WHITTEMORE, JR., ETAL 3,249,873

MINIATURIZED HELMET EXPONENTIAL HORN SPEAKER FOR A PORTABLE RADIO RECEIVER

Filed May 22, 1963

2 Sheets-Sheet 1

INVENTORS
Maurice J. Whittemore, Jr.,
BY & Donald E. Brinkerhoff
Robert E. Fowler
ATTORNEY May 3, 1966 M. J. WHITTEMORE, JR., ET AL 3,249,873

MINIATURIZED HELMET EXPONENTIAL HORN SPEAKER FOR A PORTABLE RADIO RECEIVER

Filed May 22, 1963 2 Sheets-Sheet 2

INVENTORS
Maurice J. Whittemore, Jr.,
BY E. Donald E. Brinkerhoff
Robert E. Fowler
ATTORNEY United States Patent Office 3,249,873

Patented May 3, 1966

3,249,873

MINIATURIZED HELMET EXPONENTIAL HORN SPEAKER FOR A PORTABLE RADIO RECEIVER

Maurice J. Whittemore, Jr., Russiaville, and Donald E. Brinkerhoff, Kokomo, Ind., assignors to General Motors Corporation, Detroit, Mich., a corporation of Delaware Filed May 22, 1963, Ser. No. 282,266
5 Claims. (Cl. 325—361)

This invention relates to sound reproducing means and more particularly to such means as used with portable radio receiving equipment in field use.

A very definite problem in sound reproduction is introduced by the design of suitable radio receiving equipment for individual soldiers to use in the field. In the first place, the total size and weight of the radio receiver must be kept down so that it does not interfere with the soldier's movements. Secondly, it must produce a sufficiently strong, audible signal to be useful under extreme conditions of extraneous noise and, lastly, the sound from the radio receiver itself should not dominate or blank out other ambient noise to the extent that the soldier may not be aware of local dangerous conditions. This latter situation has been found to exist when an ear phone was used with the receiver. The sound produced by the radio signals and ear phone then tended to destroy the soldier's ability to locate the direction of local ambient sounds so that he may be completely unaware of local dangerous conditions that he would have otherwise recognized due to sounds emanating therefrom.

In using a small compact radio receiver, various types of speaker units have been tried therewith. However, small cone speakers do not provide the intelligibility and volume needed without exceeding size and weight limits. The drawbacks of separate ear phones have been mentioned.

It is, therefore, an object in making this invention to provide a sound reproducing system for a portable radio receiver that is efficient under high ambient noise level conditions.

It is a further object in making this invention to provide an exponential horn system for use with a transducer in a portable radio receiver unit.

It is a further object in making this invention to provide an exponential horn system for a small portable radio receiver capable of being worn on a helmet.

It is a still further object in making this invention to provide an exponential horn system for a small portable radio receiver that provides a desired polarized sound pattern.

It is a further object in making this invention to provide an exponential horn system for a small portable radio receiver that provides a water-tight cover for the transducer mounted thereon since liquid cannot penetrate beyond a predetermined point due to the configuration used even if the complete unit is immersed.

With these and other objects in view which will become apparent as the specification proceeds, our invention will be best understood by reference to the following specification and claims and the illustrations in the accompanying drawings in which:

Figures 1, 2, 3, 4:
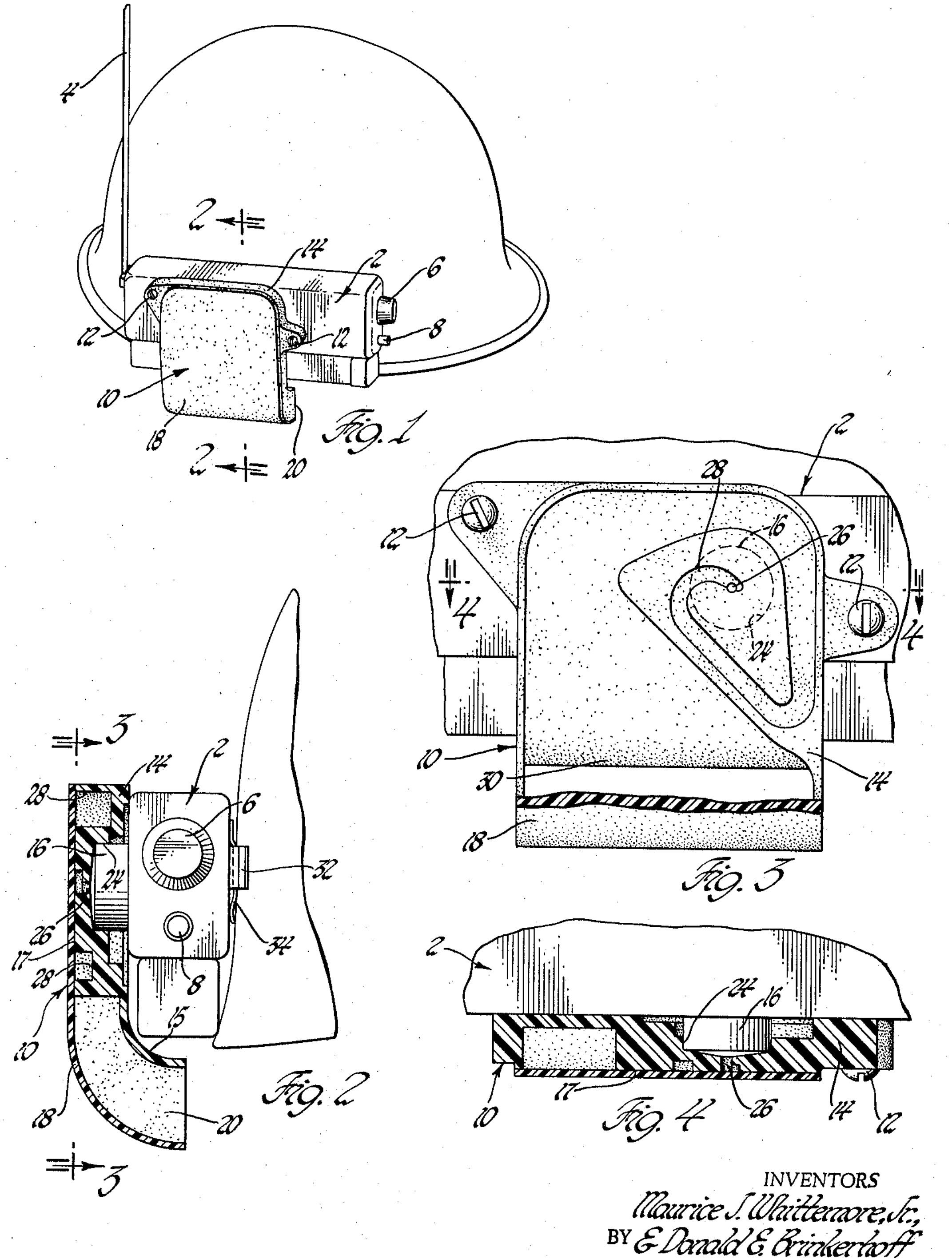
FIGURE 1 is a perspective view of a complete portable radio receiving unit in place on a helmet together with the exponential horn speaker system embodying the invention.
FIG. 2 is an enlarged sectional view taken on line 2—2 of FIG. 1.
FIG. 3 is a sectional view taken on line 3—3 of FIG. 2.
FIG. 4 is a sectional view taken on line 4—4 of FIG. 3.

As discussed above, the problem of receiving radio signals and converting the same into audible sound in a battle area for the use of an individual soldier presents a considerable problem in sound reproduction. Various types of reproducing means have been studied and used without a great deal of success. One particular problem is the distortion which is created in an attempt to use miniature speaker means and then apply thereto a considerable signal volume in the output. The main improvement provided by the present design can be stated broadly as the use of an exponential horn which has been folded up into a very compact system and is of sufficiently small size as to be usable. Exponential horn systems for the reproduction of sound have long been known to be excellent from the standpoint of efficiency and quality, but have usually necessitated large, bulky installations. One such type is the general use of exponential horn speakers in moving picture establishments. In these cases space is no problem but quality of sound production is, and that is the reason why this type of equipment is used.

In the present case, the design shown in FIGS. 1–5, inclusive, permits folding up or compressing an exponential speaker having a length of some 9 to 11 inches in a small, rectangular box-type housing whose largest dimension is only slightly more than 3 inches. The radio receiver per se is a rectangular unit which operates from a short flexible antenna and is adapted to be clipped onto the side of the helmet to be worn by the soldier. This is clearly shown in FIG. 1 where such a complete radio receiver identified generally as 2 is shown having a flexible antenna 4 which can be bent down to lie along one surface of the case. On one end of the receiver case, there is an On-Off and volume control switch 6 and also a squelch switch 8.

To one face of the radio receiver there is secured the exponential horn system identified generally at 10. This unit may be secured to the side of the radio receiver by suitable screws 12. The exponential horn system is formed of a first block of plastic material 14 in which the horn outline is molded. This block is roughly rectangular in shape, being a little longer than it is wide, and which has its lower end bent around underneath the radio receiver at the bottom as shown at surface 15. A second plastic plate 18 is permanently secured to the outer surface of the first member sealing the cut out passage therein to complete the exponential horn track to an output duct 20 which is directed toward the ear of the helmet wearer when the unit is in place on the head.

The configuration of the side of the exponential horn assembly which faces the radio receiving set can be seen best generally in FIGS. 2, 3 and 4. There is shown in face 15 of member 14 a circular depression 24 into which may fit the acoustic sound transducer or small speaker unit 16 driven by the radio receiver. This small speaker unit directly faces a small hole 26 through the main plastic body 14 of the system. This hole 26, as shown best in FIG. 3, comes into one end of a curved groove 28 in the surface 17 of the member 14 which faces outwardly from the set. This curved groove 28 continues around in more or less spiral form expanding according to the mathematical formula for exponential bodies until it reaches the sides of the output mouth 30. When this side of the block 14 is covered by member 18 permanently secured thereto by adhesive or other suitable securing means, the aperture created by the groove 28 and the plate 18 is of exponential shape and provides the exponential horn outlet for the speaker unit 16. The sound, therefore, created by the unit 16 and the sound waves that enter through small opening 26 expand through the exponential horn and issue from the mouth 20 to impinge upon the ear of the wearer of the helmet.

The radio unit 2 may be clipped to the side of the helmet through the use of any securing means such as a strap 32 permanently secured to the helmet and to which certain supporting clips 34 on the back of the radio receiver may be snapped. The preceding construction is satisfactory as long as the device is worn on the helmet and any radio signals received on the antenna 4, amplified by the receiver 2 and converted to audio waves by the transducer 16 are given satisfactory reproduction through this horn system so that in even extremely noisy areas the soldier may intelligently interpret the information being fed to him.

It is desired to emphasize that the use of the current mouth, which is wide in the horizontal direction and narrow in the vertical direction, produces a narrow horizontal polar pattern of sound. This concentrates the sound for maximum efficiency and impact on the ear of the user.

It is desired to also point out that due to the configuration of the folded or wound up horn, the unit is substantially waterproof even if it is dropped into water, liquid will only flow up into the exponential horn just so far before it seals itself off, and no water can ever reach beyond a certain point to reach the transducer and damage the same. This is a very important advantage of this structure.

Figure 5:
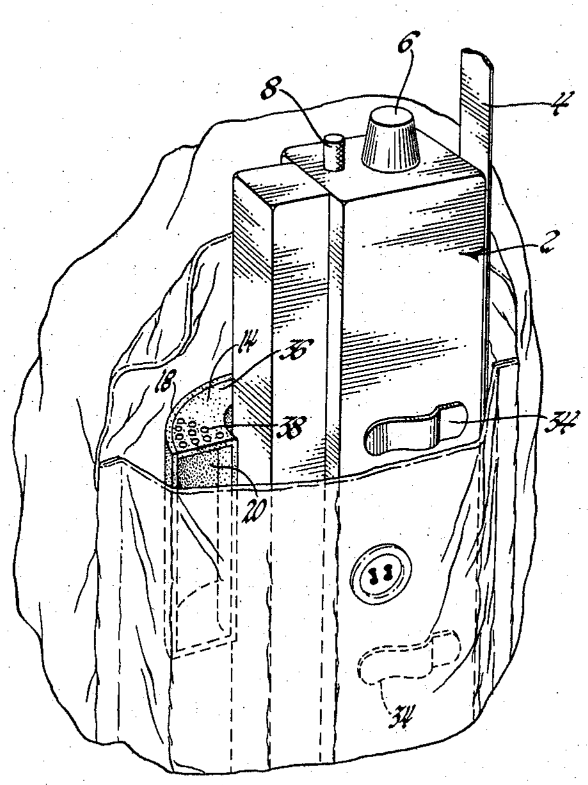
FIG. 5 is a perspective view showing the complete radio receiving device as carried in a pocket of the clothing of the wearer.

It may be that the operator may wish to remove his helmet but continue to use the radio receiver. In this case he may insert the radio receiver in the pocket of his shirt or coat. This can be done by merely unclipping it from the clip support on the helmet and inserting the complete radio set into his shirt pocket, as shown in FIG. 5. In so doing, however, the radio receiver 2 is turned at right angles to its original horizontal position so that now the main axis of the set is vertical. The set may, therefore, be operated through the use of the On-Off switch 6 or the squelch control 8 which project upwardly for easy reach. However, this positions the exponential speaker horn so that it is lying on its side and discharging sound from the mouth in a horizontal direction. While some sound will, of course, reach the ears of the operator at any rate, the upper surface 36 may have a series of holes 38 drilled therein through which the sound may be discharged upwardly toward the ears of the operator.

Figure 6:
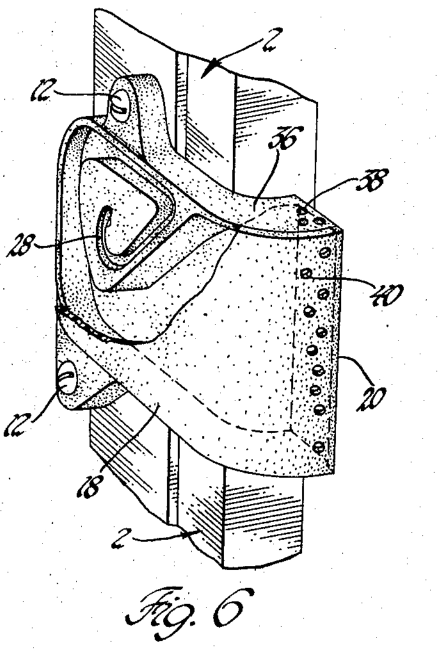
FIG. 6 is a perspective view of a modified form of exponential horn system per se with parts broken away and shown in section; and, FIG. 7 is a view similar to FIG. 6 of a still further modified form of the invention.

FIGURE 6 discloses a further modification for assisting in the establishment of sound paths between the horizontally disposed mouth and the ears of the operator above the same. In this instance it is proposed to not only provide openings 38 in the upper face 36 of the horn but also along the front edge of the panel 18 as shown at 40 to further assist in permitting the sound waves to reach the ears of the operator.

Figure 7:
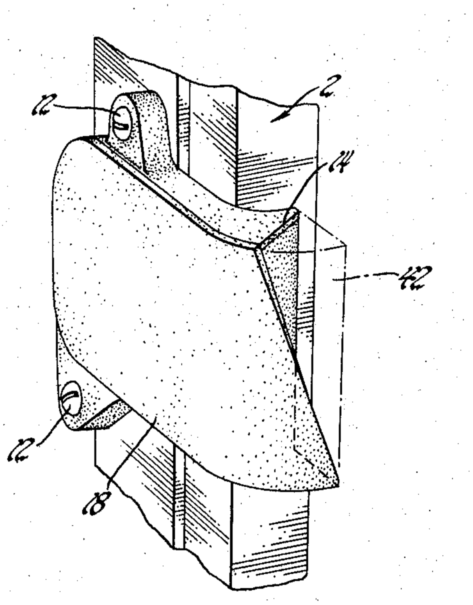

FIGURE 7 shows a yet further modified form in which instead of providing openings in a dihedral section of the mouth of the speaker the whole corner 42, as shown in dash and dotted lines, is removed therefrom to assist in the direction of the sound waves upwardly toward the operator. A corner of the front plate 18 is cut off, as shown, and also one end of the main block 14. With any of these modifications, a sufficient amount of sound is directed from the end of the exponential horn up to the ear of the operator.

What is claimed is:

1. In light portable radio receiving apparatus, a transducer for converting electrical waves to sound waves, a thin solid flat member having a depression in one face into which said transducer fits and is supported, said member having an opening therethrough from the bottom of the depression to the other face through which sound waves emanating from the transducer may pass, an expanding spiral groove in the opposite face of the member having its inception at one end of the opening through the member, said groove being so designed that its cross-sectional area expands approximately exponentially and terminates at one edge of the member and a plate whose contour fits the side of the member remote from the transducer to seal the side and form an approximately exponential channel, said plate being affixed to said thin flat member, the sound waves generated by the transducer passing through the opening in the member and thence through the exponential horn formed by the channel for improved acoustical impedance match between the transducer diaphragm and the air.

2. In light portable radio receiving means having a casing with clips thereon for attachment to supporting means, a flexible antenna on said casing amplifying and detecting means housed therein to receive high frequency modulated signals and convert the same to audio frequency signals and a transducer mounted on one side of the casing, an exponential horn system to cooperate with the transducer and amplify the audio signals generated thereby comprising a relatively thin solid flat member having a channel in one face of approximately exponential form which has its smaller terminus near the center of the member and which expands to a wide mouth at one edge of the member, said member having a depressed area in the opposite face of the size and shape of the transducer and a central aperture through to the small end of the exponential channel so that the transducer fits snugly in said depression when the member is secured to the radio receiving means casing, means for securing the member to the casing, the sound waves emanating from the transducer passing through said central aperture and thence through the essentially exponential channel for improved acoustical efficiency.

3. In miniature loud speaker apparatus for use on light low power portable radio receivers, a first thin solid flat member curved at one edge, a groove in one face of said member of generally spiral form commencing at a point substantially in the center of the face and terminating at the curved edge, said groove expanding in section in essentially an exponential manner, a curved plate secured to said face of the flat member and fitting the contour thereof to form with said flat member an exponential horn discharging at right angles to said plate, said first thin flat member having a depressed area of a size and shape to accommodate a transducer with a snug fit and a small channel opening from the bottom of the depressed area to the small end of groove in the opposite face to provide an approximately exponential horn for improving the acoustical efficiency of the transducer.

4. In miniature loud speaker apparatus for use on light low power portable radio receivers, a first thin solid flat member curved at one edge, a groove in one face of said member of generally spiral form commencing at a point substantially in the center of the face and terminating at the curved edge, said groove expanding in section in an exponential manner, a curved plate secured to said face of the flat thin member and fitting the contour thereof to form with said flat member an exponential horn discharging at right angles to the plane of said plate, said first thin flat member having a depressed central area in the opposite face of a size and shape to accommodate a transducer with a snug fit and a small channel opening from the bottom of the depressed area to the small end of groove cut in the first named face to provide an exponential horn for amplifying sound waves emanating from the transducer, said curved plate and one edge of the member at the curved area being provided with openings through which sound waves may pass.

5. In miniature loud speaker apparatus for use on light low power portable radio receivers, a first thin solid flat member curved at one edge, a groove molded in one face of said member of generally spiral form commencing at a point substantially in the center of the face and terminating at the curved edge, said groove expanding in section in an essentially exponential manner, a curved plate secured to said face of the thin flat member and fitting the contour thereof to form with said thin flat member an exponential horn discharging at right angles to said plate, said first thin flat member having a depressed area of a size and shape to accommodate a transducer with a snug fit, and a small channel opening from the bottom of the depressed area to the small end of groove cut in the first named face to provide an exponential horn for amplifying sound waves emanating from the transducer, a portion of said curved plate and one edge of the thin flat member adjacent its curved area being removed so that sound waves may be discharged at an angle.

References Cited by the Examiner

UNITED STATES PATENTS

| | | | |
|---|---|---|---|
| 1,643,284 | 9/1927 | Blieberger | 181—27 |
| 1,888,769 | 11/1932 | Muench | 181—27 |
| 1,931,236 | 10/1933 | Nicholson | 325—361 X |
| 2,160,166 | 5/1939 | Pausin | 181—27 |
| 2,521,423 | 9/1950 | Stuck | 325—361 |

FOREIGN PATENTS

| | | |
|---|---|---|
| 360,932 | 7/1938 | Italy. |

DAVID G. REDINBAUGH, *Primary Examiner.*

J. W. CALDWELL, *Assistant Examiner.*